US007950122B2

(12) United States Patent
Saylor

(10) Patent No.: US 7,950,122 B2

(45) Date of Patent: May 31, 2011

(54) POOL CUE CLAMP

(76) Inventor: Lewis J. Saylor, Johnstown, PA (US)

(*) Notice: Subject to any disclaimer, the term of this patent is extended or adjusted under 35 U.S.C. 154(b) by 199 days.

(21) Appl. No.: 12/292,946

(22) Filed: Dec. 1, 2008

(65) Prior Publication Data

US 2010/0133212 A1 Jun. 3, 2010

(51) Int. Cl.

| | |
|---|---|
| ***B23P 19/04*** | (2006.01) |
| ***A47F 7/00*** | (2006.01) |
| ***A47F 5/00*** | (2006.01) |
| ***A47B 96/06*** | (2006.01) |

(52) U.S. Cl. .... 29/268; 211/68; 211/86.01; 248/231.81; 269/3; 269/6

(58) Field of Classification Search .................... 29/268; 211/68, 86.01; 248/231.81; 269/3, 6
See application file for complete search history.

(56) References Cited

U.S. PATENT DOCUMENTS

| | | | | |
|---|---|---|---|---|
| 972,277 A * | 10/1910 | Spikes | 211/8 |
| 1,245,744 A * | 11/1917 | Leibner | 248/207 |
| 2,603,849 A * | 7/1952 | Epperson | 24/507 |
| 4,088,313 A * | 5/1978 | Pearson | 269/88 |
| 4,903,929 A | 2/1990 | Hoffman | |
| 5,139,221 A | 8/1992 | Lodrick | |
| 5,255,799 A | 10/1993 | Haynes | |
| D354,106 S * | 1/1995 | Thompson | D21/726 |
| 5,381,989 A | 1/1995 | Jackson | |
| D372,178 S | 7/1996 | Gossett et al. | |
| D387,114 S | 12/1997 | Bliss | |
| 5,743,581 A * | 4/1998 | Curelop et al. | 294/97 |
| 5,765,820 A | 6/1998 | Marusiak | |
| D472,090 S * | 3/2003 | Wing | D6/552 |
| 6,547,083 B2 * | 4/2003 | Zummo | 211/68 |
| 6,615,474 B2 * | 9/2003 | Ramirez | 29/450 |
| 6,644,636 B1 | 11/2003 | Ryan | |
| 6,799,756 B2 | 10/2004 | Degen | |
| 6,945,413 B1 | 9/2005 | Meyer | |
| 2008/0302217 A1 * | 12/2008 | Meissner | 81/324 |

* cited by examiner

*Primary Examiner* — Lee D Wilson
*Assistant Examiner* — Alvin J Grant
(74) *Attorney, Agent, or Firm* — Richard C. Litman

(57) ABSTRACT

The pool cue clamp is a spring squeeze clamp having sturdy, flexible fingers extending therefrom for holding pool cues. The fingers are rotatable within the clamp and can be configured to comply with horizontal, vertical or angular surfaces. The pool cue clamp holds up to five cue sticks in a vertical position.

5 Claims, 2 Drawing Sheets

POOL CUE CLAMP

BACKGROUND OF THE INVENTION

1. Field of the Invention

The present invention relates to clamps, and particularly to a pool cue clamp to hold one or more pool or billiard cue sticks in any desired orientation when not in use.

2. Description of the Related Art

In the game of billiards or pool, it is common for a player not currently shooting to rest his cue or stick against a convenient support surface, such as the arm of a chair. Due to the tapered, cylindrical shape of the cue, the cue can easily roll along the support surface and fall to the floor resulting in damage or even breakage of the cue tip or the cue itself.

While only a single billiard cue or pool stick is necessary to play billiards, billiard players are predisposed to their own favorite cues for a variety of reasons. Increasingly, these cues have fancy and elaborate finishes and include coatings and inlays of precious and rare materials. The cues may be easily scratched or damaged. For these reasons, the cues must be handled and stored carefully.

Stationery and wall-mounted cue holders are well known. While these holders serve their purpose, they have limitations. These holders may not be located near the area of play. Additionally, when players bring their own cues to a match, the stationery holder may not accommodate the number of cues.

What is needed is an easily repositionable holder which can securely hold a billiard or pool cue in a generally upright position when not in use so as to prevent the cue from falling to the floor. While racks are well known for supporting a number of billiard/pool cues when the cues are not in use, such racks are typically mounted in one location, such as on a wall, and away from the location of chairs typically situated around a billiard/pool table. Hence, it is inconvenient for a player to have to place his cue in a central rack each time he/she temporarily finishes shooting.

Thus, a pool cue clamp solving the aforementioned problems is desired.

SUMMARY OF THE INVENTION

The pool cue clamp is a spring squeeze clamp having sturdy, flexible fingers extending therefrom for holding pool cues. The fingers are rotatable within the clamp and can be configured to comply with horizontal, vertical or angular surfaces. The pool cue clamp holds up to five cue sticks in a vertical position.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
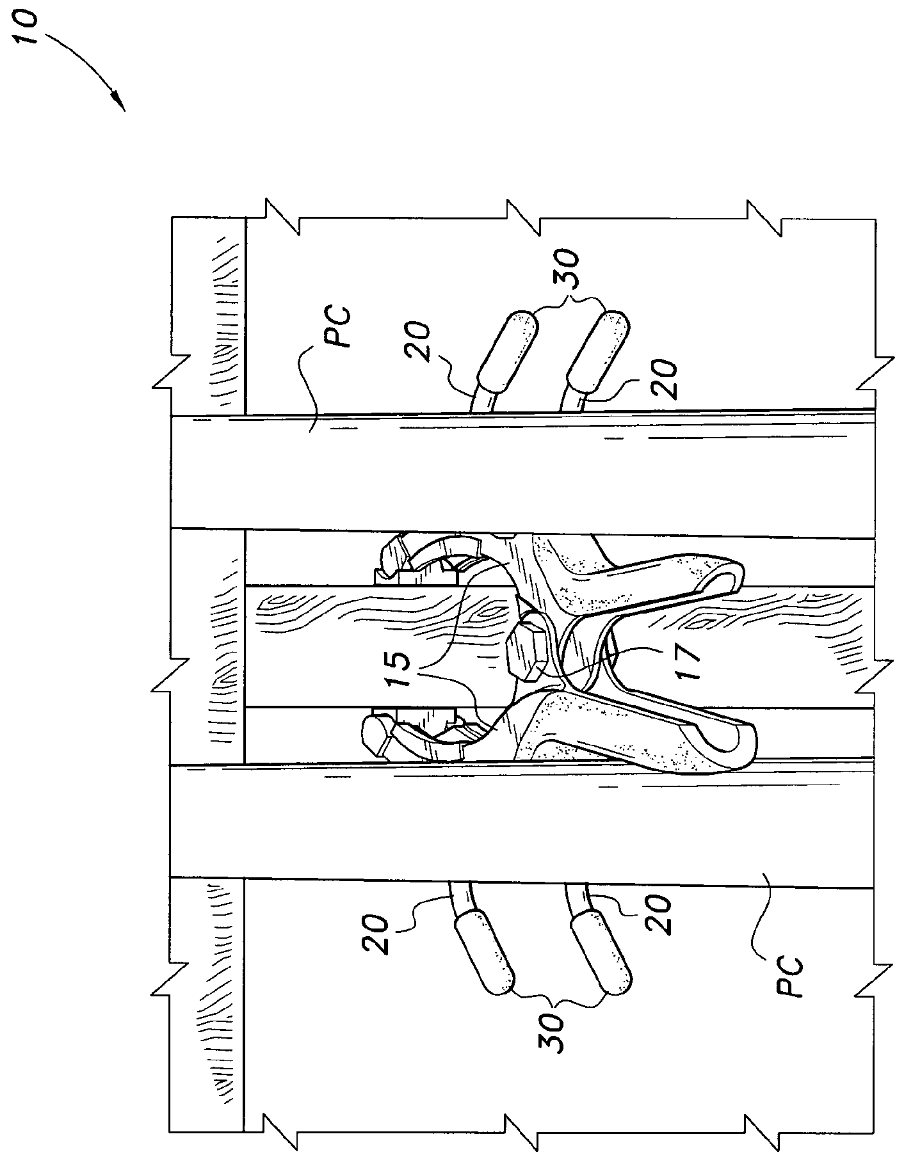
FIG. 1 is an environmental, perspective view of a pool cue clamp according to the present invention.
Figure 2:
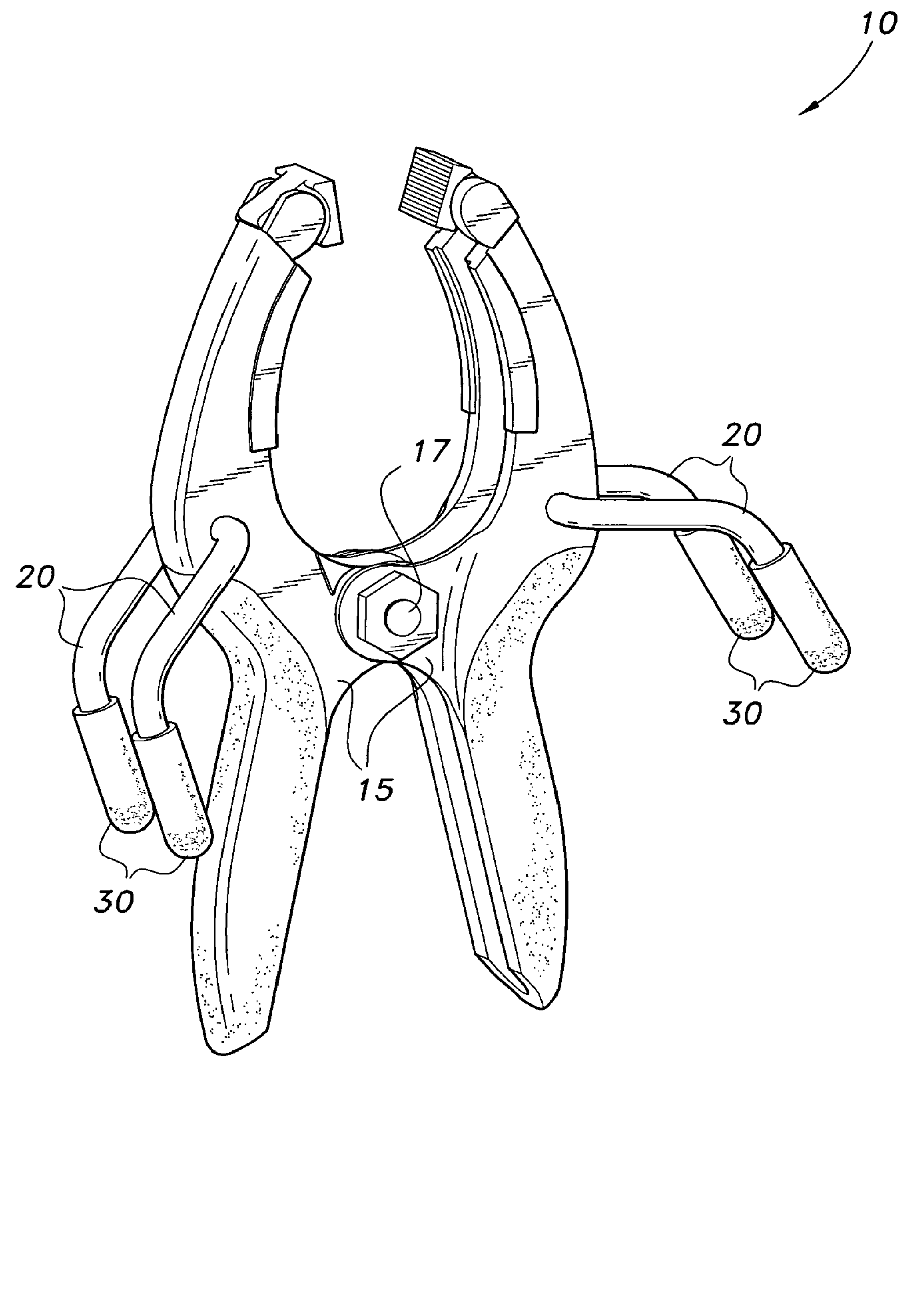
FIG. 2 is a perspective view of a pool cue clamp according to the present invention, showing retraction of the extending legs.

As shown in FIGS. 1-2, the pool cue clamp 10 has two lever arms 15, each lever arm 15 including a jaw end and a handle end, the lever arms 15 being pivotally connected to each other at a pivot point 17 located between the jaw end and the handle ends, the lever arms 15 being movable between a closed, gripping position in which the jaw ends are proximate each other and an open position in which the jaw ends are spaced apart, the lever arms 15 being spring-biased toward the closed gripping position, providing a clamping force applied by the jaw ends. The spring bias may be provided by a torsion spring disposed concentrically around the pivot pin 17 connecting the arms 15, with opposite ends of the spring bearing against the opposing lever arms 15.

Moreover, extending from the clamp 10 are sturdy, independently flexible fingers 20 (as shown in FIG. 2, two fingers 20 extend from each lever arm 15) for holding pool cues PC, which are U-shaped and have the central shaft or bight extending orthogonal to the lever arms 15. The fingers 20 are twistable and rotatable within the clamp 10, i.e., pivotally attached to the lever arms 15, and can be configured to comply with horizontal, vertical or angular surfaces. Cue protectors 30 are disposed on ends of the fingers 20. A portion of lever arms 15 that extends into the jaw ends can be substantially arcuate, the arcuate shape assisting the gripping capability of the pool cue clamp 10 by biting into or enclosing an arcuate surface. Utilizing a combination of the fingers 20 and the clamp lever arms 15, the pool cue clamp 10 can hold up to five cue sticks PC in a vertical position.

It is to be understood that the present invention is not limited to the embodiment described above, but encompasses any and all embodiments within the scope of the following claims.

I claim:

1. A pool cue clamp, comprising:

two lever arms, each of the lever arms having a jaw end and a handle end;

a pivot pin pivotally connecting the lever arms together at a pivot point disposed between the jaw end and the handle ends, the pivot pin defining an axis about which the lever arms rotate, the lever arms being movable between a closed, gripping position in which the jaw ends are proximate each other and an open position in which the jaw ends are spaced apart, the lever arms being spring-biased toward the closed gripping position, providing a clamping force applied by the jaw ends;

a plurality of fingers extending from each of the lever arms, the fingers being pivotally attached to each of the lever arms and defining a pivotal axis, wherein the pivotal axis of each of the fingers is parallel to the pivot pin axis of the lever arms.

2. The pool cue clamp according to claim 1, further comprising protective tips disposed on ends of the fingers.

3. The pool cue clamp according to claim 1, wherein a portion of the lever arms extending into the jaw ends is substantially arcuate.

4. The pool cue clamp according to claim 1, wherein the fingers are independently flexible so that each finger can conform to and support a pool cue.

5. The pool cue clamp according to claim 1, wherein the plurality of fingers define a pair of arcuate fingers.

* * * * *